United States Patent [19]
de Haan et al.

[11] Patent Number: 5,148,269
[45] Date of Patent: Sep. 15, 1992

[54] MOTION VECTOR PROCESSING DEVICE

[75] Inventors: Gerard de Haan; Hendrik Huijgen, both of Eindhoven, Netherlands

[73] Assignee: U.S. Philips Corporation, New York, N.Y.

[21] Appl. No.: 727,745

[22] Filed: Jul. 10, 1991

[30] Foreign Application Priority Data

Jul. 20, 1990 [EP] European Pat. Off. ............ 90201976

[51] Int. Cl.$^5$ ............................................. H04N 7/01
[52] U.S. Cl. .................................... 358/105; 358/140
[58] Field of Search .................... 358/105, 140, 136

[56] References Cited

U.S. PATENT DOCUMENTS

| | | | |
|---|---|---|---|
| 4,661,849 | 4/1987 | Hinman | 358/136 |
| 4,691,230 | 9/1987 | Kaneko et al. | 358/105 |
| 4,864,398 | 9/1989 | Avis et al. | 358/105 X |
| 4,890,160 | 12/1989 | Thomas | 358/105 |
| 4,924,310 | 5/1990 | von Brandt | 358/136 |
| 4,937,666 | 6/1990 | Yang | 358/136 |
| 5,060,064 | 10/1991 | Lamnabhi | 358/140 X |

FOREIGN PATENT DOCUMENTS

0293644 12/1988 European Pat. Off. .

OTHER PUBLICATIONS

IEEE "Transactions on Pattern Analysis and Machine Intelligence", vol. 11, No. 7, Jul. 1989.

*Primary Examiner*—Victor R. Kostak
*Attorney, Agent, or Firm*—Edward W. Goodman

[57] ABSTRACT

In motion compensated interpolation of TV-pictures it is usual to divide the picture into a plurality of blocks, a motion vector being determined for each block. This division into blocks has the disadvantage, that sometimes block boundaries become visible (dirty window effect). The invention generates a continuous vector field from the blocked vector field with the aid of a median filter which calculates for each subblock (H1) from a number of subblocks (H1 . . . H4) into which each block (H) is divided, a motion vector based on the motion vectors of the original block (H) to which the subblock belongs, and of the original blocks (E, G) adjacent to the subblock (H1) concerned.

7 Claims, 2 Drawing Sheets

FIG.3

MOTION VECTOR PROCESSING DEVICE

BACKGROUND OF THE INVENTION

1. Field of the Invention

The invention relates to a motion vector processing (including storage or transmission) device, for processing motion vectors corresponding to pictures being subdivided into a number of blocks. For each of these blocks a motion vector is available for efficient storage, transmission or processing (e.g. scan rate conversion) etc.

2. Description of the Related Art

The availability of only one vector per block of pixels can give rise to the visibility of these blocks in a picture obtained by such motion compensated processing. As a possible solution to reduce the visibility of the blocks, the vector field could be postfiltered, but this has the disadvantage that new vectors are generated, the quality of which was never checked. U.S. Pat. No. 4,703,350 describes such a post filter, which uses a raised cosine function or a linear interpolation filter to obtain motion vectors for each pixel.

When the estimator uses a matching criterion, it is possible that the average of two vectors each yielding a good match, results in a vector that gives a very bad match. One could for instance think of a periodic structure on which several matches are possible, but on which the average vector may yield a bad match.

SUMMARY OF THE INVENTION

It is (inter alia) an object of the present invention to provide a post operation on the vector field which—as does the linear post filter—yields a smooth vector field, but which does not generate unchecked motion vector components.

For this purpose, a first aspect of the invention provides a motion vector processing device for processing motion vectors corresponding to pictures being subdivided into a plurality of blocks, for each block a motion vector being available, comprising:

means for providing x and y motion vector components of a given block and of blocks adjacent to said given block;

means coupled to receive x and y motion vector components corresponding to said given block and each time two x and two y motion vector components corresponding to each time two of said adjacent blocks, for supplying for each subblock of a number of subblocks together forming said given block selected ones of these x and y motion vector components; and means for creating for each subblock x and y motion vector components based on said selected motion vector components.

According to this aspect of the invention, the output motion vector components which correspond to the subblocks into which each block has been divided, are selected from the input motion vector components which have been estimated for the original, larger blocks. Therefore, no new unchecked motion vector components are generated.

In an embodiment of the invention, said creating means comprise:

means coupled to receive said selected motion vector components for checking whether selected x and y motion vector components supplied for a same subblock correspond to a same block; and means for delivering said motion vector corresponding to said given block if said selected x and y components supplied for the same subblock do not correspond to the same block, and for delivering said selected x and y motion vector components otherwise. This ensures not only that the output vector components correspond to selected input vector components, but also that the output vectors are not composed from components which do not belong to each other.

A very smooth vector field and, consequently, very good motion compensated pictures appeared to be obtainable when using an embodiment wherein said supplying means include means for obtaining x and y median filtered vector components from the x and y motion vector components corresponding to the given block and from the two x and two y motion vector components corresponding to the two adjacent blocks.

A second aspect of the invention provides a motion vector processing device for processing motion vectors corresponding to pictures being divided into a plurality of blocks, for each block a motion vector being available, comprising:

means for providing motion vectors corresponding to a given block and to blocks adjacent to said given block;

means for creating for each subblock of a number of subblocks together forming said given block, a motion vector from the motion vectors corresponding to the given block and to at least one of said adjacent blocks;

means for checking whether said created motion vectors belong to said provided motion vectors; and means for selecting for each subblock said motion vector corresponding to said given block if the motion vector created for that subblock does not belong to said provided motion vectors, and for selecting the created motion vector itself otherwise. Also this aspect ensures that only reliable motion vectors are obtained.

A simple and reliable manner to obtain only checked motion vector components is employed in an embodiment wherein said creating means include means for supplying selected ones of x and y motion vector components corresponding to said given block and to said at least one adjacent block.

If desired, the obtained subblocks may be further subdivided. If the subdividing operation is repeated often enough, motion vectors are obtained for each pixel.

These and other (more detailed) aspects of the invention will be described and elucidated with reference to the drawings and examples.

BRIEF DESCRIPTION OF THE DRAWINGS

In the drawings:

FIG. 1 gives an example of a vector field;

FIG. 2 shows a vector field in which one block is divided into four subblocks;

FIG. 3 shows a two-step block erosion;

DESCRIPTION OF THE PREFERRED EMBODIMENTS

Figures 1, 2, 3:
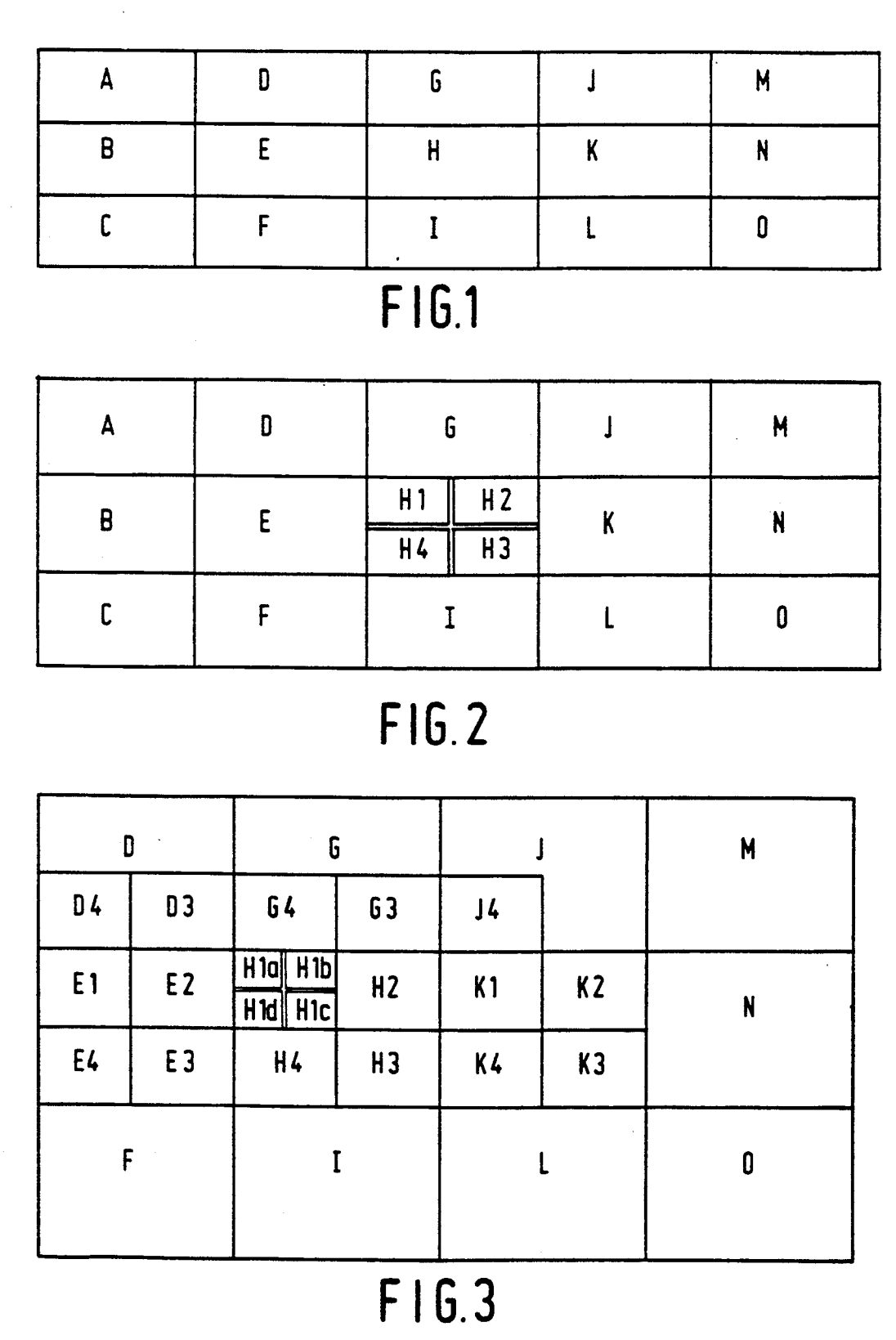

FIG. 1 gives an example of a vector field. For each block A . . . 0 of pixels only one vector is available. As is shown for a given block H in FIG. 2, in an embodiment of the present invention, each block is divided into four subblocks. The x and y vector components for a subblock become the respective median values of:

1. the x and y vector components of the given block that contains the subblock; and 2. the x and y vector components of two neighboring blocks which are adjacent to the subblock.

The x and y vector components are processed separately. Because of this separate operation, a new vector, which belongs neither to the given block nor to either of its two neighboring blocks can be created. That is why, according to a preferred embodiment of the invention, after the median operation it is checked whether the new vector is equal to one of the three input vectors. If not, the vector of the given block that contains the subblock is taken instead of the new vector; if yes, the new vector itself is used as the vector corresponding to the subblock for subsequent motion compensated processing.

So for the subblocks H1, H2, H3, H4, the vector value is calculated as follows, using symbols derived from programming languages. H.x indicates the x component of the motion vector of block H. $<>$ means "is not equal to".

$H1.x = \text{median}(H.x, E.x, G.x)$ $H1.y = \text{median}(H.y, E.y, G.y)$

If (H1<>H) and (H1<>E) and (H1<>G) then H1=H $H2.x = \text{median}(H.x, G.x, K.x)$ $H2.y = \text{median}(H.y, G.y, K.y)$ If (H2<>H) and (H2<>G) and (H2<>K) then H2=H $H3.x = \text{median}(H.x, I.x, K.x)$ $H3.y = \text{median}(H.y, I.y, K.y)$ If (H3<>H) and (H3<>I) and (H3<>K) then H3=H $H4.x = \text{median}(H.x, I.x, E.x)$ $H4.y = \text{median}(H.y, I.y, E.y)$ If (H4<>H) and (H4<>I) and (H4<>E) then H4=H This process can—if necessary e.g. for large initial block sizes—be repeated for the subblocks. Each subblock is then subdivided into four parts. Subblock H1 for example, is divided into the parts H1a ... H1d. The resulting vector becomes the median value of the vectors from the subblock and its neighboring blocks.

Again, according to said preferred embodiment, it is checked that only existing vectors result from the process. FIG. 3 illustrates the process. The vector for part H1a now becomes:

$H1a.x = \text{median}(H1.x, E2.x, G4.x)$ $H1a.y = \text{median}(H1.y, E2.y, G4.y)$ If (H1a<>H1) and (H1a<>E2) and (H1a<>G4) then H1a=H1

Figure 4:
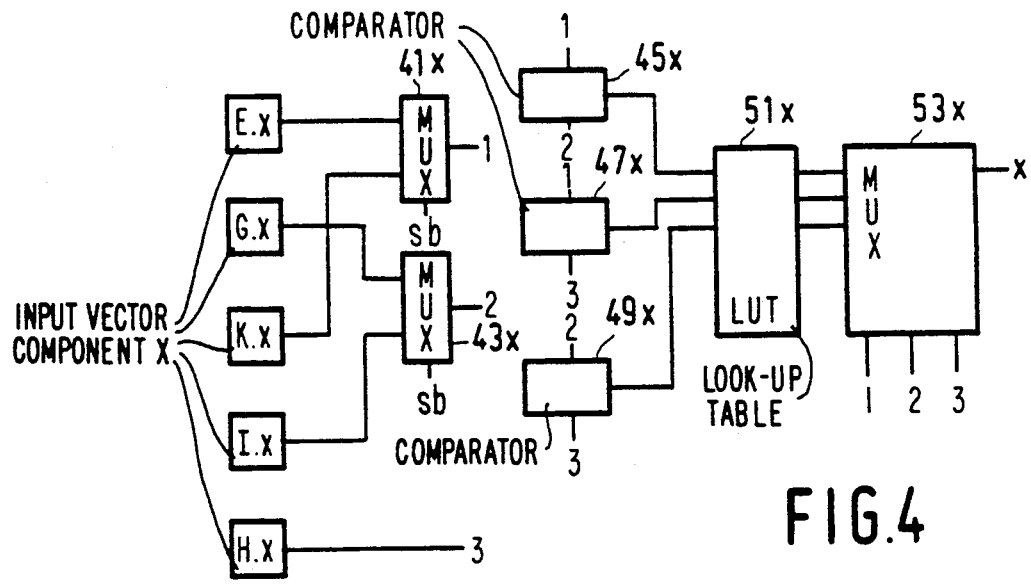
FIG. 4 shows a first embodiment of a one step block eroder.

FIG. 4 shows a first embodiment of a one-step block eroder according to the invention. The example shown calculates 4 motion vectors for each one of the subblocks H1 ... H4 of block H. The implementation shown deals only with the x components of the vectors; the y components are processed similarly.

As is apparent from FIG. 2, for subblock H1, blocks E, G and H are relevant; for subblock H2, blocks G, K and H are relevant; for subblock H3, blocks K, I and H are relevant; and for subblock H4, blocks I, E and H are relevant. Under the control of a subblock pointer sb, multiplexers 41x and 43x select the relevant motion vector components of the relevant neighboring blocks for application to the subsequent median filtering operation. Comparators 45x, 47x and 49x and look-up-table (LUT) 51x determine the median of the vector components 1 and 2 outputted by multiplexers 41x and 43x, respectively, and of the vector component 3 of block H itself. For a more detailed description of median determination, reference is made to U.S. Pat. No. 4,740,820 (PHA 11.613), incorporated herein by reference. Controlled by LUT 51x, multiplexer 53x selects the median of vector components 1, 2 and 3 for outputting as the x-component of the subblock concerned.

Alternatively, multiplexer 53x could select from the input vector components E.x, G.x, K.x, I.x and H.x. In that case, the subblock pointer sb should be applied to LUT 51x as well.

Figure 5:
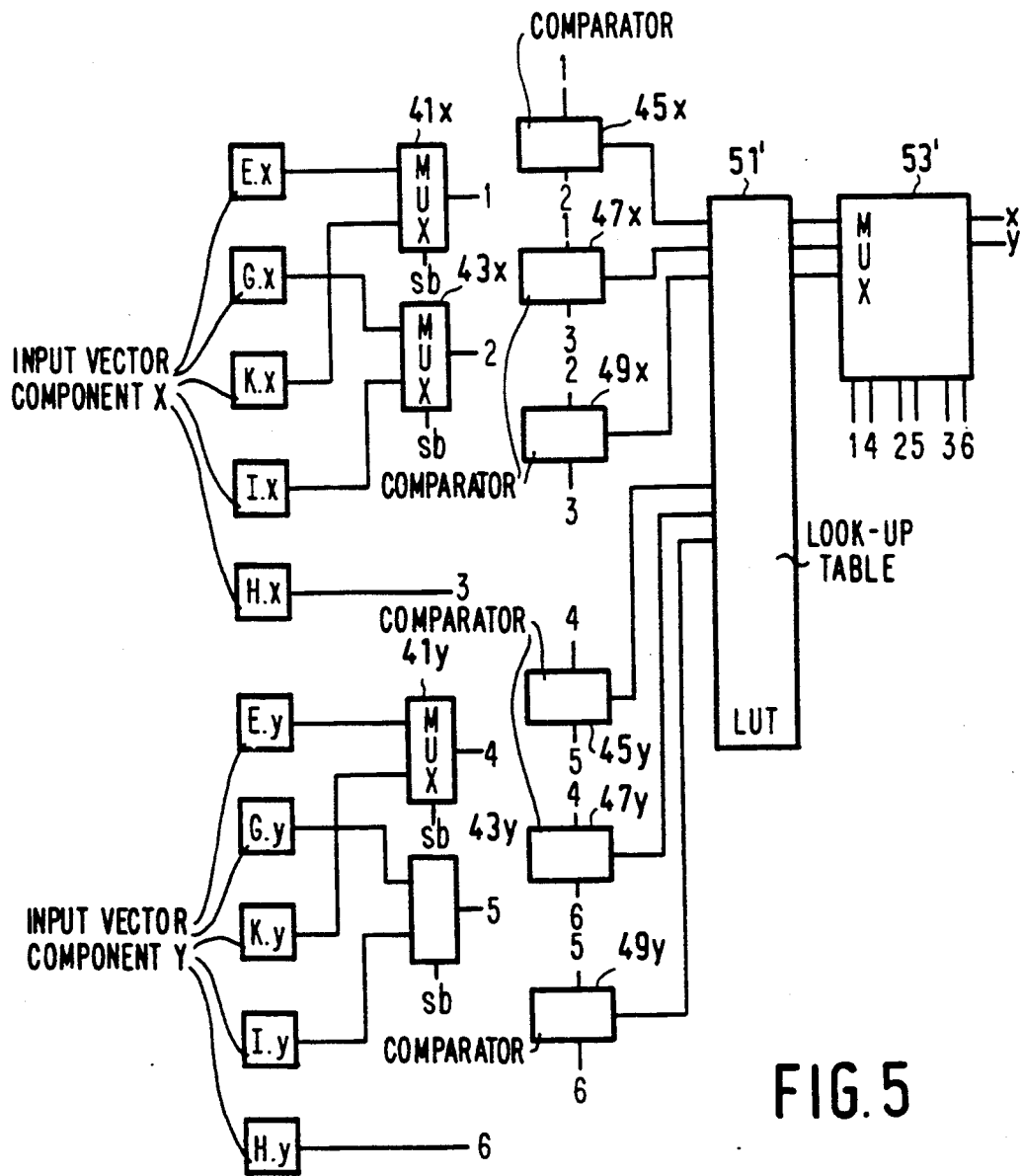
FIG. 5 shows a second embodiment of a one-step block eroder.

FIG. 5 shows a second embodiment of a one-step block eroder, in which both x and y components are dealt with by LUT 51' to ensure that the output x and y vector components originate from the same input vector. In the programming language statements mentioned above, this checking operation corresponds to each third statement. When the motion vector estimator itself already yields a rather smooth vector field, as e.g. the estimator described in Applicants' article "New algorithm for motion estimation" presented at the Third International Workshop on HDTV, Torino, 1989, this checking operation can be left out, since simulations showed that the checking operation changed the decision for only a small percentage of blocks, and leaving it out introduced no visible artifacts.

The difference between FIGS. 4 and 5 is mainly that separate LUTs 51x (shown) and 51y (not shown) are replaced by a single, more complex, LUT 51' which in addition has to perform the above-mentioned checking operation. In FIG. 5 one dual 3-state multiplexer 53' is shown; however, two multiplexers 53x (as shown in FIG. 4) and 53y both controlled by LUT 51' are also possible. As already mentioned with reference to FIG. 4, if in an alternative embodiment the subblock pointer would be applied to LUT 51', one dual 5-state multiplexer or two separate 5-state multiplexers would also be possible.

We claim:

1. Motion vector processing device for processing motion vectors corresponding to pictures being subdivided into a plurality of blocks, for each block a motion vector being available, comprising:

means for providing x and y motion vector components of a given block and of blocks adjacent to said given block;

means coupled to said providing means for supplying, for each subblock of a number of subblocks together forming said given block, x and y motion vector components selected from said x and y motion vector components of said given block and from the x and y motion vector components of two blocks adjacent to said subblock; and means for creating for each subblock, x and y motion vector components based on said selected motion vector components.

2. Motion vector processing device as claimed in claim 1, wherein said creating means comprise:
means coupled to receive said selected motion vector components for checking whether selected x and y motion vector components supplied for a same subblock correspond to a same block; and
means for delivering said motion vector corresponding to said given block if said selected x and y components supplied for the same subblock do not correspond to the same block, and for delivering said selected x and y motion vector components otherwise.

3. Motion vector processing device as claimed in claim 1, wherein said supplying means include means for obtaining x and y median filtered vector components from the x and y motion vector components corresponding to the given block and from the two x and two y motion vector components corresponding to the two adjacent blocks.

4. Motion vector processing device as claimed in claim 2, wherein said supplying means include means for obtaining x and y median filtered vector components from the x and y motion vector components corresponding to the given block and from the two x and two y motion vector components corresponding to the two adjacent blocks.

5. Motion vector processing device for processing motion vectors corresponding to pictures being divided into a plurality of blocks, for each block a motion vector being available, comprising:
means for providing motion vectors corresponding to a given block and to blocks adjacent to said given block;
means for creating for each subblock of a number of subblocks together forming said given block, a motion vector from the motion vectors corresponding to the given block and to at least one of said adjacent blocks;
means for checking whether said created motion vectors belong to said provided motion vectors; and
means for selecting for each subblock said motion vector corresponding to said given block if the motion vector created for that subblock does not belong to said provided motion vectors, and for selecting the created motion vector itself otherwise.

6. Motion vector processing device as claimed in claim 5, wherein said creating means include means for supplying selected ones of x and y motion vector components corresponding to said given block and to said at least one adjacent block.

7. Motion vector processing device as claimed in claim 5, wherein said creating means include means for obtaining x and y median filtered motion vector components from x and y motion vector components corresponding to said given block and from two x and two y motion vector components corresponding to two blocks adjacent to the subblock for which the motion vector is created.

* * * * *